US012678362B2

(12) United States Patent
Heur

(10) Patent No.: US 12,678,362 B2
(45) Date of Patent: Jul. 14, 2026

(54) BONE DENSITY STEP TRAINER

(71) Applicant: Matthew Heur, La Canada, CA (US)

(72) Inventor: Matthew Heur, La Canada, CA (US)

( * ) Notice: Subject to any disclaimer, the term of this patent is extended or adjusted under 35 U.S.C. 154(b) by 217 days.

(21) Appl. No.: 18/417,876

(22) Filed: Jan. 19, 2024

(65) Prior Publication Data

US 2025/0235369 A1 Jul. 24, 2025

(51) Int. Cl.
*A63B 22/16* (2006.01)
*A61H 1/00* (2006.01)

(52) U.S. Cl.
CPC ............ *A61H 1/005* (2013.01); *A63B 22/16* (2013.01); *A61H 2201/1284* (2013.01)

(58) Field of Classification Search
CPC ...................... A61H 1/005; A61H 2201/1284; A63B 22/16; A63B 21/0552; A63B 21/0557; A63B 21/4034; A63B 23/03508; A63B 21/0058; A63B 21/00061; A63B 21/00065; A63B 21/0555; A63B 21/062; A63B 22/0046; A63B 22/0048; A63B 22/18; A63F 9/00; A63G 33/00
USPC ............................................ 124/79; 273/440
See application file for complete search history.

(56) References Cited

U.S. PATENT DOCUMENTS 1,730,726 A * 10/1929 Carl ...................... A63B 65/12 273/108
1,866,021 A * 7/1932 Fey .......................... A63F 7/00 273/108
3,421,760 A * 1/1969 Freeman, Jr. ...... A63B 23/1263 482/130
9,162,106 B1 * 10/2015 Scheiman .......... A63B 21/0552
D776,211 S * 1/2017 Gebhard ...................... D21/685
2004/0138034 A1 * 7/2004 Endelman .......... A63B 22/0056 482/121
2010/0009823 A1 * 1/2010 Reyes ................ A63B 23/0429 482/129

OTHER PUBLICATIONS

Monroe, Derrick. "How to Build a Strongman Carnival Game—High Striker Game Blueprint." Minneapolis Real Estate, Feb. 25, 2014 , www.derrickmonroe.com/blog/build-strongman-carnival-game-high-striker/. Accessed Oct. 18, 2025. (Year: 2014).*
SwissDadMakes. "Home Made High-Striker I Carnival Game." YouTube, Dec. 4, 2019, www.youtube.com/watch?v=DbdpFwe8U0Q. Accessed Oct. 18, 2025. (Year: 2019).*

* cited by examiner

*Primary Examiner* — Megan Anderson
*Assistant Examiner* — Catrina A Letterman
(74) *Attorney, Agent, or Firm* — Clement Cheng

(57) ABSTRACT

The frame has a right upper frame member and a left upper frame member. The step trainer has a launcher formed as a lever. The lever is mounted on a lever pivot. The step trainer has a striker rail. The striker rail is vertically oriented and mounted to the frame. The frame includes a lower striker rail mount and an upper striker rail mount. The striker rail is mounted to a lower striker rail mount and an upper striker rail mount. A striker is slidingly mounted to the striker rail. The striker has a lower striker rail position and an upper striker rail position. The bone density step trainer optionally further includes a chime assembly mounted to the frame. The chime assembly has an upper chime and a lower chime.

5 Claims, 3 Drawing Sheets

BONE DENSITY STEP TRAINER

TECHNICAL FIELD

The present disclosure relates to a bone density step trainer.

BACKGROUND

A variety of different devices have been devised for preventing and recovering from osteoporosis. Certain exercises can be helpful for maintaining and nourishing bone density.

Various clinical studies, methods, and research outcomes have been documented, underscoring the clinical challenge presented by osteoporosis in the elderly. The heightened fragility of bones due to osteoporosis can lead to fractures in almost any bone. These fractures are linked to elevated healthcare expenses, physical limitations, diminished quality of life, and higher mortality rates. Given that the occurrence of osteoporotic fractures rises with age, it becomes imperative to address the diagnosis and prevention of osteoporosis and its associated complications as a crucial public health issue.

For example, in European patent number EP2842610 issued Apr. 3, 2015, entitled "Lower Body Mimetic Exercise Device With Fully or Partially Autonomous Right and Left Leg Links and Ergonomically Positioned Pivot Points", by Nathan R. Luger and Thomas C. Coy, the invention discloses, "The present invention discloses an exercise device according to claim 1. The invention is directed to a variable gait exercise device with fully or partially autonomous right and left leg links and ergonomically positioned hip and/or knee pivot points.

A stationary lower body mimetic exercise machine capable of providing a versatile foot support motion that conforms to the natural, innate and ergonomic striding motion of the user, as opposed to influencing a user into a machine chosen striding motion, can be achieved by providing the machine with left-right autonomous calf links with ergonomically aligned hip and/or calf pivot points, with each combination of autonomy and ergonomic alignment possessing certain unique subtle refinements in interaction between the machine and its human operator. In a first aspect, the exercise machine is a stationary lower body mimetic exercise machine wherein (i) user orientation on the machine is determined by at least one of (–) configuring the frame to accommodate user access onto the exercise machine from the rearward end of the frame, and (–) providing a display mounted to the frame for displaying information viewable by a forward facing orthostatic user supported upon the foot supports, (ii) the first and second hip pivot points define a laterally extending upper pivot axis, (iii) the left and right leg linkages selectively interact such that the calf members pivot autonomously relative to one another about the knee pivot points while the thigh members are interconnected for synchronized out of phase pivoting about the hip pivot points, and (iv) the thigh members, calf members and foot supports are supported, configured and arranged such that the upper pivot axis will pass through or posterior to the hip region of an orthostatic forward facing suited user supported upon the foot supports with the foot supports horizontally and vertically aligned.

For example, in the study of Increase in femoral bone density in young women following high-impact exercise by E J Bassey and S J Ramsdale, published March 1994 states, "Healthy premenopausal women were randomized into control and test groups; both exercised weekly in class and daily at home for a year. The test class did intermittent high-impact exercise; the control class did low-impact exercise. Bone density was assessed blind using dual energy X-ray absorptiometry at the femur (neck, Ward's triangle and trochanter) and at the lumbar spine (antero-posterior L1-4) on entry into the study, and again after 6 months (n=27) and 12 months (n=19). At 6 months the test group (n=14) showed a significant increase of 3.4% in trochanteric bone density (p=0.01) and this was significantly different from control (p=0.05). In the second 6 months the control group was crossed over to high-impact exercise and showed a significant increase of 4.1% in trochanteric density (n=7) while the original group maintained their improvement relative to baseline."

For example, in the study of Exercise and Sports Science (ESSA) position statement on exercise prescription for the prevention of management of osteoporosis by Belinda R Beck, Robin M Daly, Maria A Fiatarone Singh, and Dennis R Taffee, published May 20, 2017, states, "Osteoporotic fractures are associated with substantial morbidity and mortality. Although exercise has long been recommended for the prevention and management of osteoporosis, existing guidelines are often non-specific and do not account for individual differences in bone health, fracture risk and functional capacity. The aim of the current position statement is to provide health practitioners with specific, evidence-based guidelines for safe and effective exercise prescription for the prevention or management of osteoporosis, accommodating a range of potential comorbidities. Evidence from animal and human trials indicates that bone responds positively to impact activities and high intensity progressive resistance training. Furthermore, the optimisation of muscle strength, balance and mobility minimises the risk of falls (and thereby fracture), which is particularly relevant for individuals with limited functional capacity and/or a very high risk of osteoporotic fracture. It is important that all exercise programs be accompanied by sufficient calcium and vitamin D, and address issues of comorbidity and safety. For example, loaded spine flexion is not recommended, and impact activities may require modification in the presence of osteoarthritis or frailty."

For example, in the study of Exercise for the prevention of osteoporosis in postmenopausal women: an evidence based guide to the optimal prescription by Robin M Daly, Jack Dalla Via, Rachel L Duckham, Steve F Fraser, and Eva Wulff Helge, published Apr. 23, 20219, states, "Osteoporosis and related fragility fractures are a global public health problem in which pharmaceutical agents targeting bone mineral density (BMD) are the first line of treatment. However, pharmaceuticals have no effect on improving other key fracture risk factors, including low muscle strength, power and functional capacity, all of which are associated with an increased risk for falls and fracture, independent of BMD. Targeted exercise training is the only strategy that can simultaneously improve multiple skeletal and fall-related risk factors, but it must be appropriately prescribed and tailored to the desired outcome(s) and the specified target group."

For example, in the study of High-Impact Exercise Increased Femoral Neck Bone Density with No Adverse Effects on Imaging Markers of Knee Osteoarthritis in Postmenopausal Women, by Christ Hartley, Jonathan P Folland, Robert Kerslake, and Katherine Brooke-Wavell, published Oct. 29, 2019, states, "High-impact exercise can improve femoral neck bone mass but findings in postmenopausal women have been inconsistent and there may be concern at the effects of high-impact exercise on joint health. We investigated the effects of a high-impact exercise intervention on bone mineral density (BMD), bone mineral content (BMC), and section modulus (Z) as well as imaging biomarkers of osteoarthritis (OA) in healthy postmenopausal women. Forty-two women aged 55 to 70 years who were at least 12 months postmenopausal were recruited. The 6-month intervention consisted of progressive, unilateral, high-impact exercise incorporating multidirectional hops on one randomly assigned exercise leg (EL) for comparison with the contralateral control leg (CL). Dual-energy X-ray absorptiometry (DXA) was used to measure BMD, BMC, and Z of the femoral neck. Magnetic resonance imaging (MRI) of the knee joint was used to analyze the biochemical composition of articular cartilage using T2 relaxometry and to analyze joint pathology associated with OA using semi-quantitative analysis. Thirty-five participants (61.7±4.3 years) completed the intervention with a mean adherence of 76.8%+22.5%. Femoral neck BMD, BMC, and Z all increased in the EL (+0.81%, +0.69%, and +3.18%, respectively) compared to decreases in the CL (−0.57%, −0.71%, and −0.75%: all interaction effects $p<0.05$). There was a significant increase in mean T2 relaxation times (main effect of time $p=0.011$) but this did not differ between the EL and CL, indicating no global effect. Semiquantitative analysis showed high prevalence of bone marrow lesions (BML) and cartilage defects, especially in the patellofemoral joint (PFJ), with no indication that the intervention caused pathology progression. In conclusion, a high-impact exercise intervention that requires little time, cost, or specialist equipment improved femoral neck BMD with no negative effects on knee OA imaging biomarkers. Unilateral high-impact exercise is a feasible intervention to reduce hip fracture risk in healthy postmenopausal women.

For example, in the study of Mechanical Loading of the Femoral Neck in Human Locomotion by Mariana E Kersh, Saulo Martelli, Roger Zebaze, Ego Seeman, and Marcus G Pandy, published Jul. 18, 2018, states, "Advancing age and reduced loading are associated with a reduction in bone formation. Conversely, loading increases periosteal apposition and may reduce remodeling imbalance and slow age-related bone loss, an important outcome for the proximal femur, which is a common site of fracture. The ability to take advantage of bone's adaptive response to increase bone strength has been hampered by a lack of knowledge of which exercises and specific leg muscles load the superior femoral neck: a common region of microcrack initiation and progression following a sideways fall. We used an in vivo method of quantifying focal strains within the femoral neck in postmenopausal women during walking, stair ambulation, and jumping. Relative to walking, stair ambulation and jumping induced significantly higher strains in the anterior and superior aspects of the femoral neck, common regions of microcrack initiation and progression following a fall. The gluteus maximus, a hip extensor muscle, induced strains in the femoral neck during stair ambulation and jumping, in contrast to walking which induced strains via the iliopsoas, a hip flexor. The ground reaction force was closely associated with the level of strain during each task, providing a surrogate indicator of the potential for a given exercise to load the femoral neck. The gluteal muscles combined with an increased ground reaction force relative to walking induce high focal strains within the anterosuperior region of the femoral neck and therefore provide a target for exercise regimens designed to slow bone loss and maintain or improve microstructural strength."

For example, in the study of Exercise Prescription and the Minimum Dose for Bone Remodeling Needed to Prevent Osteoporosis in Postmenopausal Women: A Systematic Review by Feeba Sam Koshy, Kitty George, Prakar Poudel, Roopa Chalasani, Mastiyage R Goonathilake, Sara Waqar, Sheeba George, Wilford Jean-Baptise, Amina Yusuf Alo, Bithaiah Inyang, and Lubna Mohammed, published Jun. 16, 2022, states, "The aim of this review is to analyze previously conducted randomized controlled trials and investigate the relationship between various exercise regimes and their effect on bone mineral density in postmenopausal women. To determine whether exercise can be used as a non-pharmacological modality for osteoporosis prevention, a thorough search was performed on various databases (PubMed, ScienceDirect, and Google Scholar). Only bone mineral density studies and trials with intervention versus control groups were included, and 13 randomized controlled trials were deemed relevant. The majority of trials concluded that exercise positively impacted bone mineral density in postmenopausal women. High-impact exercises seem to have the most significant effect on bone mineral density due to compression, shear stress, and high loading on the bone, causing bone remodeling. Considering all the limitations, exercise seems to be an effective tool for preventing post-menopausal osteoporosis."

For example, in the study of Effects of Mechanical Stress Stimulation on Function and Expression Mechanism of Osteoblasts by Pan Liu, Ji Tu, Whenzhao Wang, Zheng Li, Yao Li, Xiaoping Yu, and Zhengdong Zhang, published Feb. 17, 2022, states, "Osteoclasts and osteoblasts play a major role in bone tissue homeostasis. The homeostasis and integrity of bone tissue are maintained by ensuring a balance between osteoclastic and osteogenic activities. The remodeling of bone tissue is a continuous ongoing process. Osteoclasts mainly play a role in bone resorption, whereas osteoblasts are mainly involved in bone remodeling processes, such as bone cell formation, mineralization, and secretion. These cell types balance and restrict each other to maintain bone tissue metabolism. Bone tissue is very sensitive to mechanical stress stimulation. Unloading and loading of mechanical stress are closely related to the differentiation and formation of osteoclasts and bone resorption function as well as the differentiation and formation of osteoblasts and bone formation function. Consequently, mechanical stress exerts an important influence on the bone microenvironment and bone metabolism. This review focuses on the effects of different forms of mechanical stress stimulation (including gravity, continuously compressive pressure, tensile strain, and fluid shear stress) on osteoclast and osteoblast function and expression mechanism. This article highlights the involvement of osteoclasts and osteoblasts in activating different mechanical transduction pathways and reports changings in their differentiation, formation, and functional mechanism induced by the application of different types of mechanical stress to bone tissue. This review could provide new ideas for further microscopic studies of bone health, disease, and tissue damage reconstruction."

For example, in the study of Modelling Human Locomotion to Inform Exercise Prescription for Osteoporosis by Saulo Martelli, Belinda Beck, David Saxby, David Lloyd, Peter Pivonka, and Mark Taylor, published Jun. 18, 2020, states, "The superior neck is a common location for hip fracture and a relevant exercise target for osteoporosis. Current modelling studies showed that fast walking and stair ambulation, but not necessarily running, optimally load the femoral neck and therefore theoretically would mitigate the natural age-related bone decline, being easily integrated into routine daily activity. High intensity jumps and hopping have been shown to promote anabolic response by inducing high strain in the superior anterior neck. Multidirectional exercises may cause beneficial non-habitual strain patterns across the entire femoral neck. Resistance knee flexion and hip extension exercises can induce high strain in the superior neck when performed using maximal resistance loadings in the average population. Exercise can stimulate an anabolic response of the femoral neck either by causing higher than normal bone strain over the entire hip region or by causing bending of the neck and localized strain in the superior cortex. Digital technologies have enabled studying interdependences between anatomy, bone distribution, exercise, strain and metabolism and may soon enable personalized prescription of exercise for optimal hip strength."

For example, in the study of Strain energy in the femoral neck during exercise by Saulo Martelli, Mariana E Kersh, Anthony G Schache, and Marcus G Pandy, published March 2014, states, "Physical activity is recommended to mitigate the incidence of hip osteoporotic fractures by improving femoral neck strength. However, results from clinical studies are highly variable and unclear about the effects of physical activity on femoral neck strength. We ranked physical activities recommended for promoting bone health based on calculations of strain energy in the femoral neck. According to adaptive bone-remodeling theory, bone formation occurs when the strain energy(S) exceeds its homeostatic value by 75%. The potential effectiveness of activity type was assessed by normalizing strain energy by the applied external load. Tensile strain provided an indication of bone fracture. External force and joint motion data for 15 low- and high-load weight-bearing and resistance-based activities were used. High-load activities included weight-bearing activities generating a ground force above 1 body-weight and maximal resistance exercises about the hip and the knee. Calculations of femoral loads were based on musculoskeletal and finite-element models. Eight of the fifteen activities were likely to trigger bone formation, with isokinetic hip extension ($\Delta S$=722%), one-legged long jump ($\Delta S$=572%), and isokinetic knee flexion ($\Delta S$=418%) inducing the highest strain energy increase. Knee flexion induced approximately ten times the normalized strain energy induced by hip adduction. Strain and strain energy were strongly correlated with the hip-joint reaction force ($R(2)=0.90$-$0.99$; $p<0.05$) for all activities, though the peak load location was activity-dependent. None of the exercises was likely to cause fracture. Femoral neck mechanics is activity-dependent and maximum isokinetic hip-extension and knee-flexion exercises are possible alternative solutions to impact activities for improving femoral neck strength."

For example, in the study of Meeting Physical Activity Guidelines Through Community-Based Group Exercise: Better Bones and Balance by Adrienne J. McNamara, Michael J Pavol, and Katherine B Gunter, published in 2013, states, "Community-based exercise programs are popular for achieving physical activity among older adults, but the amount of physical activity obtained through such programs is unknown. This study quantified the bone-loading forces and levels of cardiovascular activity associated with participation in "Better Bones and Balance" (BBB), a community-based fall- and fracture-prevention program for older adults. Methods: Thirty-six postmenopausal women age 73.2±7.6 yr engages in BBB participated in this study. Ground-reaction forces (GRFs) associated with BBB exercises were evaluated using a force platform. Session and weekly totals of minutes of moderate to vigorous physical activity (MVPA) and total time spent above 55% maximum heart rate (HR) were measured using accelerometers and HR monitors, respectively. Results: BBB exercises produced mean 1-leg GRFs of 1.4-2.2 units body weight. Weekly BBB participation was associated with 126±31 min of MVPA. Conclusion: Activity obtained by BBB participation meets recommended guidelines for skeletal and cardiovascular health."

For example, in the study of Evidence on Physical Activity and Osteoporosis Prevention for people aged 65+ year: a systematic review to inform the WHO guidelines on physical activity and sedentary behavior by Marina B Pinheiro, Juliana Oliveria, Adrian Bauman, Nicola Fairhall, Wing Kwok, and Catherin Sherrington, published Nov. 16, 2017, states, "We included a total of 59 studies, including 12 observational studies and 47 trials. Within the included trials, 40 compared physical activity with no intervention controls, 11 compared two physical activity programs, and six investigated different doses of physical activity. Included studies suggest that physical activity interventions probably improve bone health among older adults and thus prevent osteoporosis (standardised effect size 0.15, 95% CI 0.05 to 0.25, 20 trials, moderate-certainty evidence, main or most relevant outcome selected for each of the included studies). Physical activity interventions probably improve lumbar spine bone mineral density (standardised effect size 0.17, 95% CI 0.04 to 0.30, 11 trials, moderate-certainty evidence) and may improve hip (femoral neck) bone mineral density (standardised effect size 0.09, 95% CI-0.03 to 0.21, 14 trials, low-certainty evidence). Higher doses of physical activity and programs involving multiple exercise types or resistance exercise appear to be most effective. Typical programs for which significant intervention impacts were detected in trials were undertaken for 60+ mins, 2-3 times/week for 7+ months. Observational studies suggested a positive association between long-term total and planned physical activity on bone health."

For example, in the study of Ranking of osteogenic potential of physical exercises in postmenopausal women based on femoral neck strains by Pim Pelikaan, Georgios Giamatzis, Jos Vander Sloten, Sabine Verschueren, and Ilse Jonkers, published Apr. 4, 2018, states "The current study aimed to assess the potential of different exercises triggering an osteogenic response at the femoral neck in a group of postmenopausal women. The osteogenic potential was determined by ranking the peak hip contact forces (HCFs) and consequent peak tensile and compressive strains at the superior and inferior part of the femoral neck during activities such as (fast) walking, running and resistance training exercises. Results indicate that fast walking (5-6 km/h) running and hopping induced significantly higher strains at the femoral neck than walking at 4 km/h which is considered a baseline exercise for bone preservation. Exercises with a high fracture risk such as hopping, need to be considered carefully especially in a frail elderly population and may therefore not be suitable as a training exercise. Since superior femoral neck frailness is related to elevated hip fracture risk, exercises such as fast walking (above 5 km/h) and running can be highly recommended to stimulate this particular area. Our results suggest that a training program including fast walking (above 5 km/h) and running exercises may increase or preserve the bone mineral density (BMD) at the femoral neck."

For example, in the study of The Quantification, Autoregulation, and Reliability of the Stomp as an Osteogenic Exercise by Chloe M. C. Ryan, Tracey L. Clissold, and Paul W. Winwood, published Apr. 9, 2021, states "Performing jump-landings may not be suitable for some individuals when programming for bone health. This study quantified a stomp exercise to determine its magnitude (body weight's [BW's]) and rate (body weights per second [BW·s−1]) of strain among premenopausal women. Twenty healthy premenopausal women [Mean±SD: 41.7±5.6y; 68.2±10.6 kg; 165±5.5 cm; 27.5±8.7% body fat] performed stomps on left and right legs at different rate of perceived exertions (RPE's) (5 and 8) within the same session. The stomp RPE5 resultant magnitudes (3.08 and 2.89, BW's) and rates of strain (199 and 180, BW·s−1) for right and left legs (respectively), performed on a Kistler force plate, were similar to previously determined osteogenic thresholds (>3BW's and >43 BW·s−1 respectively). The stomp performed at RPE8, significantly (p<0.001) exceeded stomps performed at RPE5 (4.58 and 4.42, BW's and 344 and 333, BW·s−1). The within-session reliability was good to excellent (0.68 to 0.89) for stomps performed at RPE5 and moderate to excellent (0.56 to 0.90) for stomps performed at RPE8. The stomp exercise achieves osteogenic thresholds thought prerequisite for bone growth in premenopausal women and can be safely and reliably auto regulated by individuals for use in bone health programs where jump-landings may be contraindicated."

For example, in the study of Effect of two jumping programs on hip bone mineral density in premenopausal women: a randomized controlled trial by Larry A tucker, J Eric Strong, James D LeCheminant, and Bruce W Bailey, published February 2015, states "The purpose is to determine the effect of two jumping programs on hip bone mineral density (BMD) in women." The results of the study indicated "At 8 weeks, unadjusted percentage change in hip BMD was significantly different among groups (F=5.4, p=0.0236). Specifically, compared with controls, the Jump 20 women had significantly greater gains in hip BMD and the Jump 10 women had marginally greater improvements. Following 16 weeks of jumping, differences between the Jump 10 and the Jump 20 groups compared with controls were significant (F=4.2, p=0.0444), especially after adjusting for the covariates (F=7.3, p=0.0092)." The conclusion was, "After 16 weeks of high-impact jump training, hip BMD can be improved in premenopausal women by jumping 10 or 20 times, twice daily, with 30 seconds of rest between each jump, compared with controls."

For example, in the study of Mechanical regulation of bone remodeling by Eu-Leong Yong and Susan Logan, published April 2021, states, "Screening for osteoporosis in women can be based on age and weight, using the Osteoporosis Screening Tool for Asians and assessment for other risk factors such as early menopause, Chinese ethnicity and other secondary factors. Based on the resulting risk profile, women can be triaged to dual-energy X-ray absorptiometry (DEXA) scanning for definite diagnosis of osteoporosis. Treatment should be considered in women with previous fragility fractures, DEXA-diagnosed osteoporosis and high risk of fracture. Exercise improves muscle function, can help prevent falls and has moderate effects on improvements in bone mass. Women should ensure adequate calcium intake and vitamin D. Menopausal hormone therapy (MHT) effectively prevents osteoporosis and fractures, and should be encouraged in those aged <50 years. For women aged <60 years, MHT or tibolone can be considered, especially if they have vasomotor or genitourinary symptoms. Risedronate or bisphosphonates may then be reserved for those aged over 60 years."

For example, in the trial of Simple, novel physical activity maintains proximal femur bone mineral density, and improves muscle strength and balance in sedentary, postmenopausal Caucasian women by C M Young, B K Weeks, and B R Beck, published Oct. 18, 2017, the method used were, "Forty-five postmenopausal women not taking medications for bone health were randomly assigned to one of three groups. All groups attended one line dance class per week. Two groups additionally performed progressively loaded squats five times per week. One group also performed four foot stamps, twice daily, five times per week. Broadband ultrasound attenuation (BUA), proximal femur (PF) and lumbar spine (LS) bone mineral density (BMD), squats number, and balance variables were measured." The results ended in "There were no differences within or between groups in baseline and follow-up BUA, PF or LS BMD; however, a strong stamp compliance effect was apparent for BUA (r=0.73) and PF BMD (r=0.79). Number of squats (p<0.01) and single leg stance time (p<0.01) increased, while timed up and go time decreased (p<0.01) for all participants." They concluded that "Line dancing, particularly in concert with regular squats and foot stamping, is a simple and appealing strategy that may be employed to reduce lower extremity bone loss, and improve lower limb muscle strength and balance, in independent living, otherwise healthy, postmenopausal Caucasian women."

Matthew Heur the inventor had an idea when he and his team were helping older people in the club, "Strong Teens Stronger Community" which allows teenagers to volunteer and help older people move heavy items around the house. During his volunteer time, he so that many older people suffered from a weaker body due to lack of exercise or osteoporosis. The elders needed a more fun and easier to use exercise machine for the lower body. Seeing this long-felt need, the inventor proceeded with the development of the following invention.

SUMMARY OF THE INVENTION

A bone density step trainer comprising a frame. The frame has a right upper frame member and a left upper frame member. The step trainer has a launcher formed as a lever. The lever is mounted on a lever pivot. The step trainer has a striker rail. The striker rail is vertically oriented and mounted to the frame. The frame includes a lower striker rail mount and an upper striker rail mount. The striker rail is mounted to a lower striker rail mount and an upper striker rail mount. A striker is slidingly mounted to the striker rail. The striker has a lower striker rail position and an upper striker rail position. The bone density step trainer optionally further includes a chime assembly mounted to the frame. The chime assembly has an upper chime and a lower chime. The upper chime is mounted above the lower chime and the striker is configured to hit the lower chime before hitting the upper chime.

The bone density step trainer may also have a resistance device that includes resistance members connecting between the launcher and a launcher base mounted below the launcher. The resistance device further includes a first resistance member, and a second resistance member. The first resistance member for connects to a first resistance band mount, and the second resistance member connects to a second resistance band mount. The first resistance band mount is formed on the launcher. The second resistance member is formed on the launcher. The first resistance member is connected to the launcher base. The second resistance member is connected to the launcher base. The first resistance member is removable, the second resistance member is also removable removing various resistance members decreases the resistance. The first resistance member and the second resistance member can be formed of elastomeric tubing.

The bone density step trainer has a third resistance member and a fourth resistance member. The third resistance member connects to a third resistance band mount. The fourth resistance member connects to a fourth resistance band mount. The third resistance band mount is formed on the launcher. The fourth resistance member is formed on the launcher. The third resistance member is connected to the launcher base. The fourth resistance member is connected to the launcher base. The third resistance member is removable, and the fourth resistance member is removable. The frame includes a front frame section, a right frame section, and a left frame section. The front frame section is connected to the right frame section and the left frame section. The right frame section forms a right handrail and the left frame section forms a left handrail. The front frame section includes the striker rail.

Figure 1:
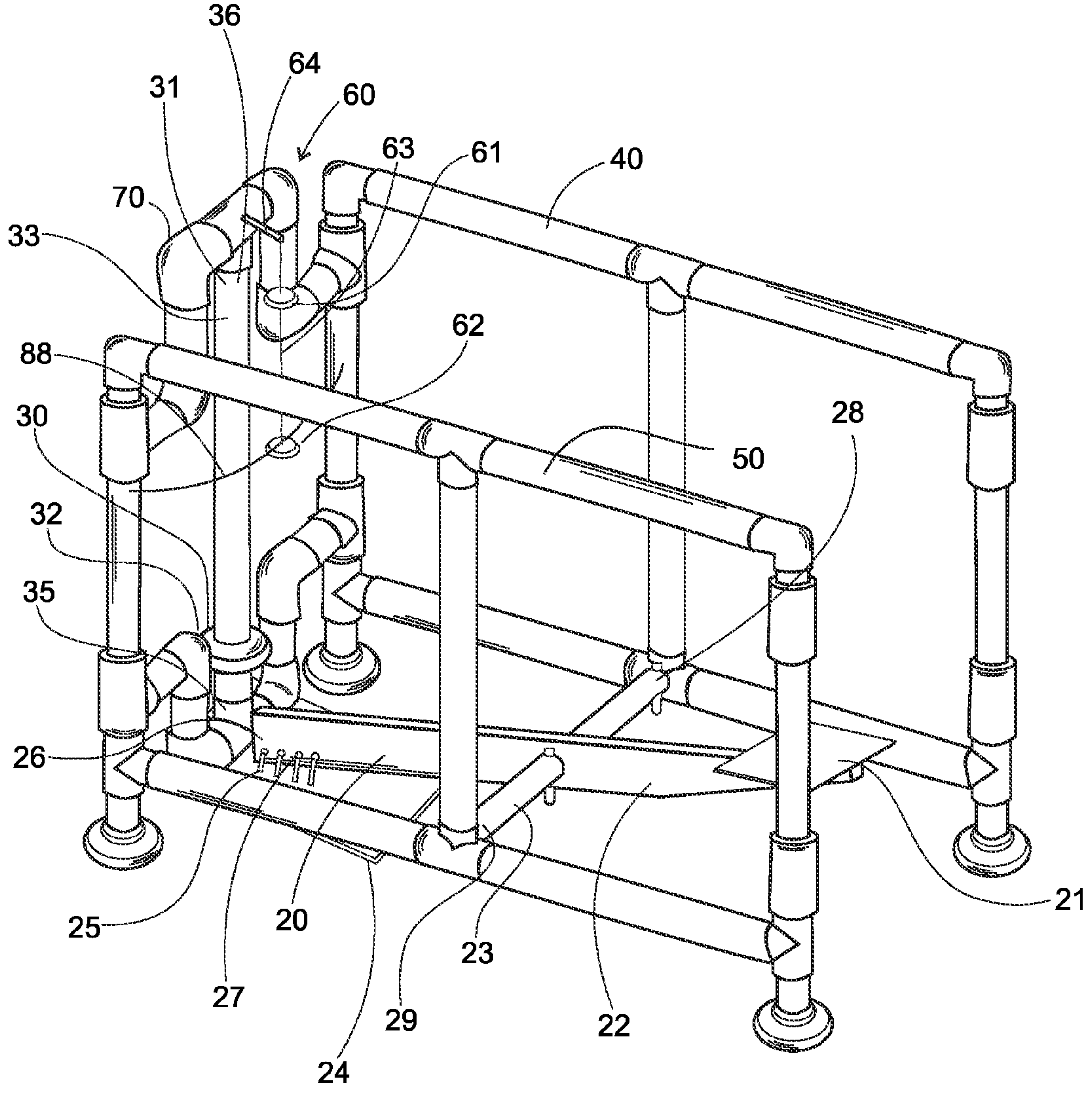
FIG. 1 is a left perspective view of the present invention.

The following call out list of elements can be a useful guide in referencing the element numbers of the drawings.

20 launcher
21 step
22 lever
23 lever pivot
24 launcher base
25 resistance bands
26 lever engaging tip
27 resistance band mount
28 lever pivot right connection
29 lever pivot left connection
30 striker
31 striker rail
32 striker lower position
33 striker upper position
35 lower striker rail mount
36 upper striker rail mount
40 right frame section
41 right upper member
42 right lower member
43 right front member
44 right rear member
45 right middle member
46 right front foot
47 right rear foot
50 left frame section
51 left frame upper member
52 left frame lower member
53 left front member
54 left rear member
55 left middle member
56 left front foot
57 left rear foot
60 chime
61 upper chime
62 lower chime
63 chime connector
64 chime mount
70 front frame section
71 first resistance member
72 second resistance member

73 third resistance member
74 fourth resistance member
141 right rear upper elbow
142 right front upper elbow
144 right rear lower elbow
145 right middle lower tee
146 right front lower elbow
147 right rear foot riser
148 right front foot riser
151 left rear upper elbow
152 left front upper elbow
153 left middle upper tee
154 left rear lower elbow
155 left middle lower tee
156 left front lower elbow
157 left rear foot riser
158 left front riser
170 resistance device

DETAILED DESCRIPTION OF THE PREFERRED EMBODIMENT

As shown in FIG. 1, the bone density step trainer is configured as a high striker game with a stepping lever 22. The right frame section 40 and the left frame section 50 retain a lever pivot 23. The lever 22 is mounted pivotally to the lever pivot 23. A step 21 can be provided and transfers downward force into an upward force of a launcher 20. The launcher 20 has a launcher base 24 held down by the front frame section 70. Resistance devices such as resistance bands 25 can adjust for a launching force of the launcher 20. The launcher 20 hits the striker 30. The striker 30 travels upwardly and may strike a chime 60. The chime 60 may include a lower chime 62 and an upper chime 61. The force required to launch the striker to the chime can be calibrated by adjusting resistance of the resistance devices. The resistance bands 25 can be omitted or added or changed to higher or lower strength depending upon user requirements. With supervised use, the patient can improve their bone density.

The user can step between the right frame section 40 and the left frame section 50. If necessary, the step 21 can be omitted. A user can step on the lever 22 directly or the lever 22 can have a flat upper surface that forms an integrated step 21. The user can grasp the right frame section and the left frame section while stomping on the step 21. The lever 22 is mounted to the lever pivot 23. The lever 23 may have additional supports that can contact the ground, or the lever pivot can be free-floating. The lever pivot 23 connects to the lever pivot right connection 28 and the lever pivot left connection 29. The tip of the launcher 20 hits the striker 30 when the striker 30 is in the striker lower position 32. The striker 30 slides on the striker rail 31 between a striker upper position 33 and a striker lower position 32. The height of the striker 30 after a user leg stomp provides an indication of force applied. A sensor such as a strain gauge in the lever 22, can provide a time differentiated force curve output for computer data analysis such as by a wireless system. An electronic force curve output analysis can provide additional information. Without a sensor, the apparatus can function purely mechanically without electricity as the striker height can be calibrated to force applied. The resistance bands can be calibrated to a height of the striker.

Resistance bands can be made of elastic cord, elastomeric tubing, springs or the like. The resistance bands 25 can be mounted to the resistance band mounts 27 formed on the lever 22. For example, if the resistance devices are formed as elastomeric tubing, the resistance devices can be mounted to the resistance band mount 27. The resistance band mount 27 can be an opening through the lever 22 such that the resistance bands 25 are mounted to the launcher base 24. The launcher base 24 can be a plank that is anchored to the front frame section 70, the right frame section 40, or the left frame section 50. The resistance bands 25 are preferably mounted to the launcher base 24 near the lever engaging tip 26. The lever engaging tip 26 strikes the striker 30.

The lower striker rail mount 35 is aligned to the launcher 20. The lower striker rail mount 35 supports the striker rail 31 at a lower end of the striker rail. The upper striker rail mount 36 supports the striker rail 31 at an upper end of the striker rail 31. The chime 60 can be mounted to the upper striker rail mount 36 at a chime mount 64. The chime mount 64 can be formed as a bracket or extension that extends from the upper striker rail mount 36. The chime mount 64 can retain a chime connector 63 that retains the upper chime 61 and the lower chime 62. The chime connector 63 can be formed as a wire or rod that is semi flexible allowing striking without substantially affecting the motion of the striker 30. The lower chime 62 can have chime lower connections such as wires or rods that retain the lower chime 62 in position. For example, the lower chime 62 can have chime lower connectors 88 that branch from the lower chime to the right frame section 40 and the left frame section 50.

Figure 2:
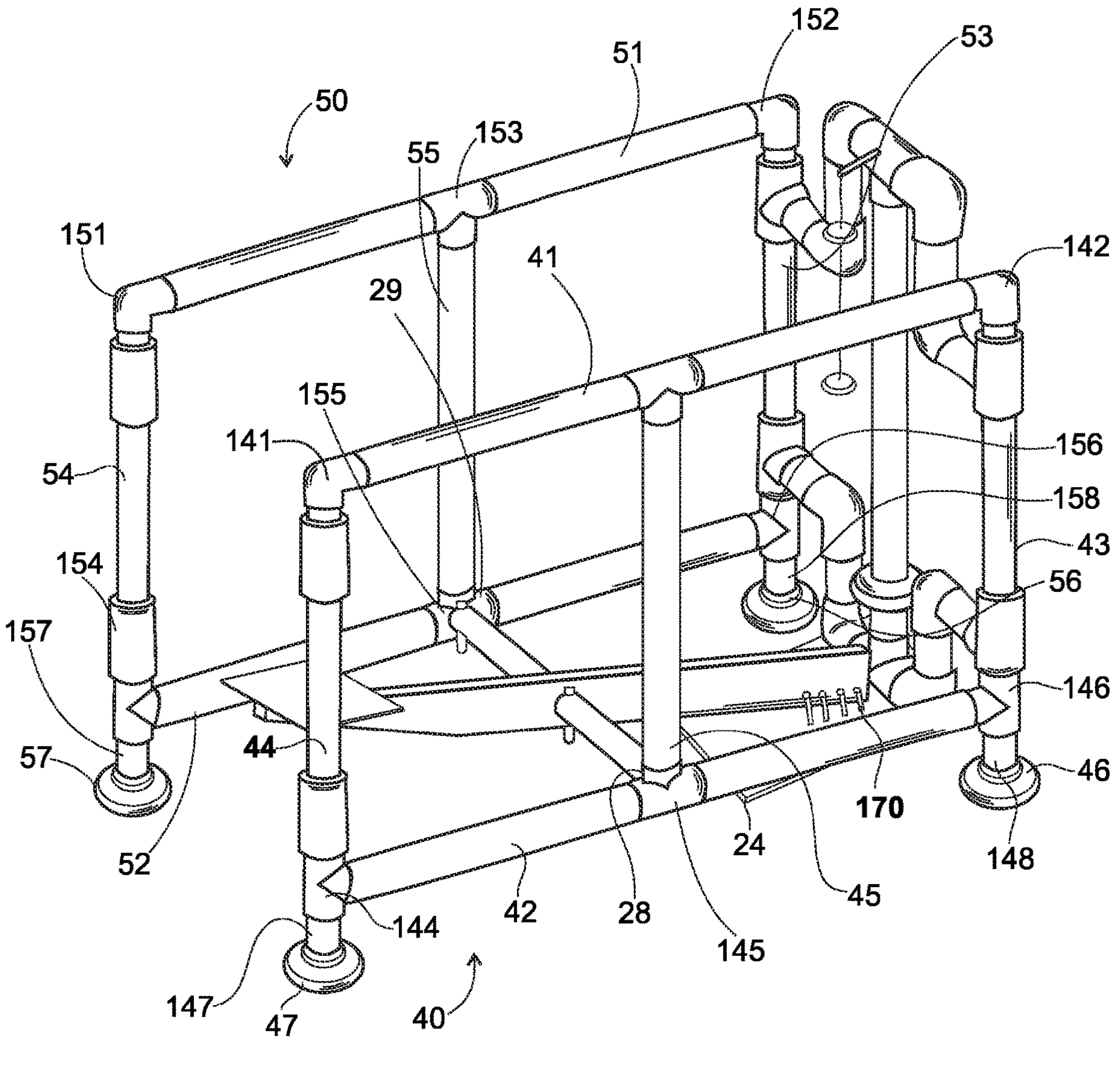
FIG. 2 is a right perspective view of the present invention.

As seen in FIG. 2, the right frame section 40 has a right upper member 41 that forms a rail allowing a user to have a handhold. The rail is an upper rail and the right upper member 41 connects to the right rear upper elbow 141, the right middle upper tee 143, and the right front upper elbow 142. The upper rail can be formed in a pair of sections, or in a single tube as a single section. The left frame section similarly has a left upper rail which is preferably at the same height as the right upper rail. The left frame section 50 has a left frame upper member 51 which can next between a left rear upper elbow 151, a left middle upper tee 153, and a left front upper elbow 152.

The right lower member 42 makes a connection between the right rear lower elbow 144, the right middle lower tee 145, and the right front lower elbow 146. The left frame lower member 52 connects between a left rear lower elbow 154, a left middle lower tec, and a left front lower elbow 156.

The right rear lower elbow 144 preferably connects to a right rear foot riser 147 which can be formed as a tube riser. The right rear foot riser 147 mounts to the right rear foot 47. The right front lower elbow 146 connects to the right front foot riser 148 which mounts to the right front foot 46. The left rear lower elbow 154 preferably connects to a right rear foot riser 157 which can be formed as a tube riser. The right rear foot riser 157 mounts to the right rear foot 57. The right front lower elbow 156 connects to the right front foot riser 158 which mounts to the right front foot 56. The four feet, namely the left front foot 56, the right front foot 46, the right rear foot 47, and the left rear foot 57 can have a padded or grippy bottom that provides a stability for the frame.

The right rear member 44 connects between the right rear upper elbow 141, and the right rear lower elbow 144. The right rear member 44 is a generally vertical support. The right middle member 45 is a generally vertical support that connects between the right middle upper tee 143 and the right middle lower tee 145. The right front member 43 connects between the right front upper elbow 142 and the right front lower elbow 146. Similarly, the left frame section 50 can be formed with three vertical supports, namely a front, middle and rear vertical support. The left rear member 54 connects between the left rear upper elbow 151, and the left rear lower elbow 154. The left rear member 54 is a generally vertical support. The left middle member 55 is a generally vertical support that connects between the left middle upper tee 153 and the left middle lower tee 155. The left front member 53 connects between the left front upper elbow 152 and the right left lower elbow 156.

The front frame section 70 connects to the right frame 40 at a right front upper elbow 142 and a right front lower elbow 146. The front frame section 70 connects to the left frame at the left front upper elbow 152 and a left front lower elbow 156.

Figure 3:
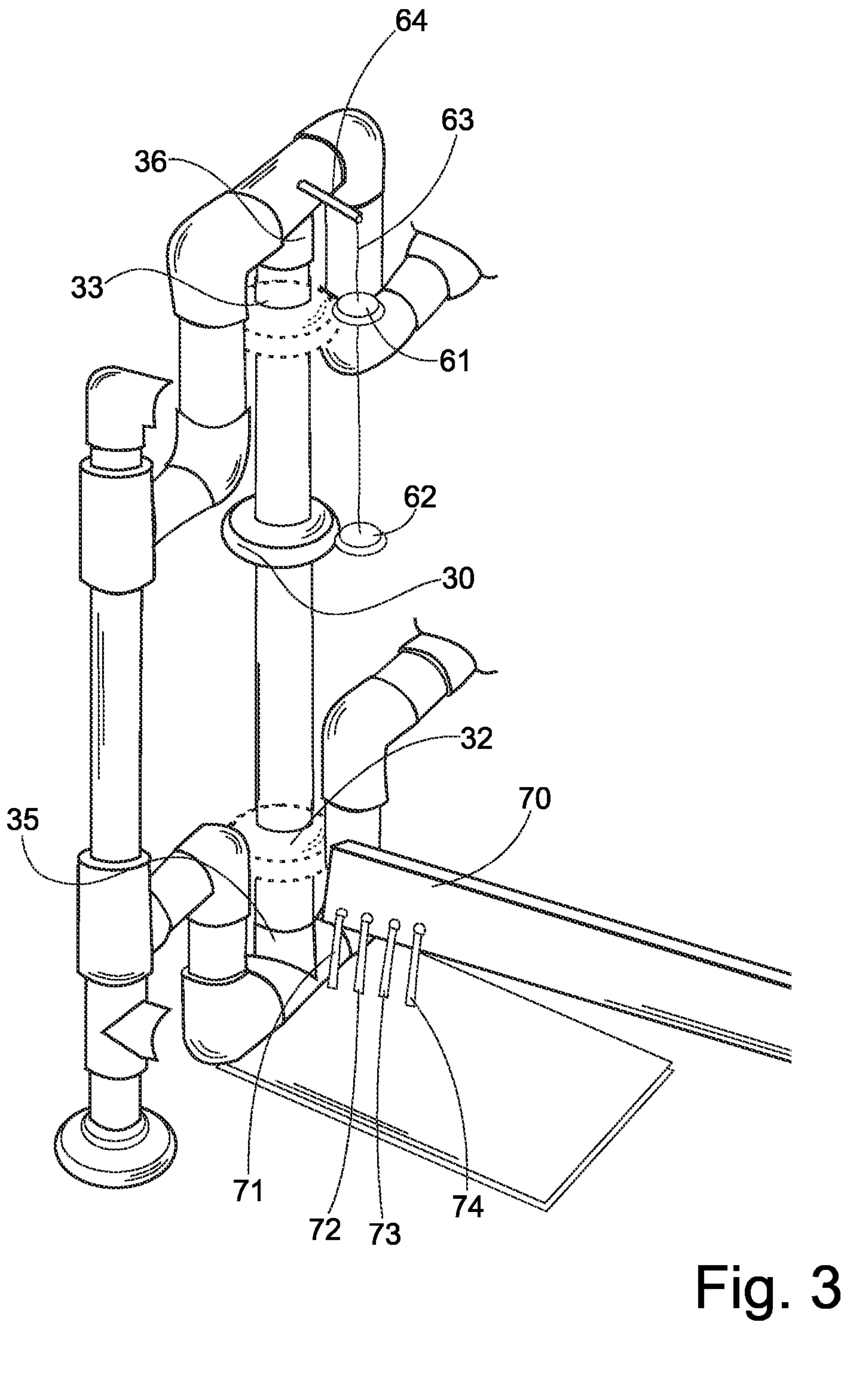
FIG. 3 is an enlarged view of the striker assembly.

As seen in FIG. 3, a variety of different indicator scales can be mounted behind the striker as a gauge can have force listings to provide a scale of the force, energy or other mechanical output to allow for clinical measurement. The indicator scales can be printed on boards or on output a digital display that can be placed behind the striker rail 31. The different scales can be calibrated to different band configurations or to different resistances that correspond to different band configurations. For example, a first indicator scale and a second indicator scale can be provided on a left or right side of different displays mounted behind the striker rail.

The invention claimed is:

1. A bone density step trainer comprising:

a. a frame, wherein the frame has a right upper frame member and a left upper frame member;

b. a launcher, wherein the launcher is formed as a lever, wherein the lever is mounted on a lever pivot;

c. a striker rail, wherein the striker rail is vertically oriented and mounted to the frame, wherein the frame includes a lower striker rail mount and an upper striker rail mount, wherein the striker rail is mounted to the lower striker rail mount and the upper striker rail mount;

d. a striker slidingly mounted to the striker rail, wherein the striker has a lower striker rail position and an upper striker rail position; and e. a resistance device which includes a first resistance member, and a second resistance member, wherein the first resistance member connects to a first resistance band mount, and wherein the second resistance member connects to a second resistance band mount, wherein the first resistance band mount is formed on the launcher, wherein the second resistance member is formed on the launcher, wherein the first resistance member is connected to a launcher base, wherein the second resistance member is connected to the launcher base, wherein the first resistance member is removable, wherein the second resistance member is removable, wherein the first resistance member and the second resistance member are formed of elastomeric tubing.

2. The bone density step trainer of claim 1, further including a third resistance member and a fourth resistance member, wherein the third resistance member connects to a third resistance band mount, and wherein the fourth resistance member connects to a fourth resistance band mount, wherein the third resistance band mount is formed on the launcher, wherein the fourth resistance band mount is formed on the launcher, wherein the third resistance member is connected to the launcher base, wherein the fourth resistance member is connected to the launcher base, wherein the third resistance member is removable, wherein the fourth resistance member is removable.

3. The bone density step trainer of claim 2, wherein the frame includes a front frame section, a right frame section, and a left frame section, wherein the front frame section is connected to the right frame section and the left frame section, wherein the right frame section forms a right handrail and wherein the left frame section forms a left handrail, wherein the front frame section includes the striker rail.

4. The bone density step trainer of claim 3, further comprising: a chime assembly mounted to the frame.

5. The bone density step trainer of claim 4, wherein the chime assembly further includes an upper chime and a lower chime, wherein the upper chime is mounted above the lower chime and wherein the striker is configured to hit the lower chime before hitting the upper chime.

* * * * *